United States Patent [19]

Konuma

[11] Patent Number: 5,596,433
[45] Date of Patent: Jan. 21, 1997

[54] HEAD-MOUNTED IMAGE DISPLAY APPARATUS HAVING A PRISM WITH AN ASPHERICAL SURFACE

[75] Inventor: Osamu Konuma, Hachioji, Japan

[73] Assignee: Olympus Optical Co., Ltd., Tokyo, Japan

[21] Appl. No.: 233,763

[22] Filed: Apr. 26, 1994

[30] Foreign Application Priority Data

Apr. 27, 1993 [JP] Japan .................................. 5-101371

[51] Int. Cl.$^6$ ................................................ G02B 27/14
[52] U.S. Cl. ........................ 359/631; 359/630; 359/637; 359/638
[58] Field of Search ..................... 359/629, 630, 359/631, 637, 638, 639, 640; 348/115

[56] References Cited

U.S. PATENT DOCUMENTS

| | | | |
|---|---|---|---|
| 4,859,030 | 8/1989 | Rotier | 359/631 |
| 4,968,117 | 11/1990 | Chern et al. | 359/573 |
| 4,969,714 | 11/1990 | Fournier, Jr. et al. | 359/630 |
| 4,969,724 | 11/1990 | Ellis | 359/364 |
| 5,278,696 | 1/1994 | Suvada | 359/629 |
| 5,303,085 | 4/1994 | Rallison | 359/631 |
| 5,309,169 | 5/1994 | Lippert | 345/8 |

FOREIGN PATENT DOCUMENTS

3191389  8/1991  Japan .

Primary Examiner—David C. Nelms
Assistant Examiner—Andrew Q. Tran
Attorney, Agent, or Firm—Cushman, Darby & Cushman IP Group of Pillsbury Madison & Sutro LLP

[57] ABSTRACT

An image display apparatus, for example, a head-mounted image display apparatus, which has a compact magnifying optical system designed so that the horizontal angle of view is as wide as 30° or more, and yet the most off-axis distortion can be reduced to about 5%. The image display apparatus has a display device (D), an optical system (L+R) for projecting the content of information displayed by the display device (D) on an observer's eyeball as a enlarged virtual image without effecting image formation in the optical path, and an optical axis bending device (P) for bending the optical axis of the optical system. The optical axis bending device (P) is a beam splitter prism having a semitransparent surface. The beam splitter prism has an aspherical surface ($r_{11}$) constituting a surface thereof which faces the display device (D). The aspherical surface ($r_{11}$) is shaped so that the power thereof changes from a relatively positive value to a relatively negative value as the distance from the optical axis of the prism increases toward the periphery thereof.

14 Claims, 12 Drawing Sheets

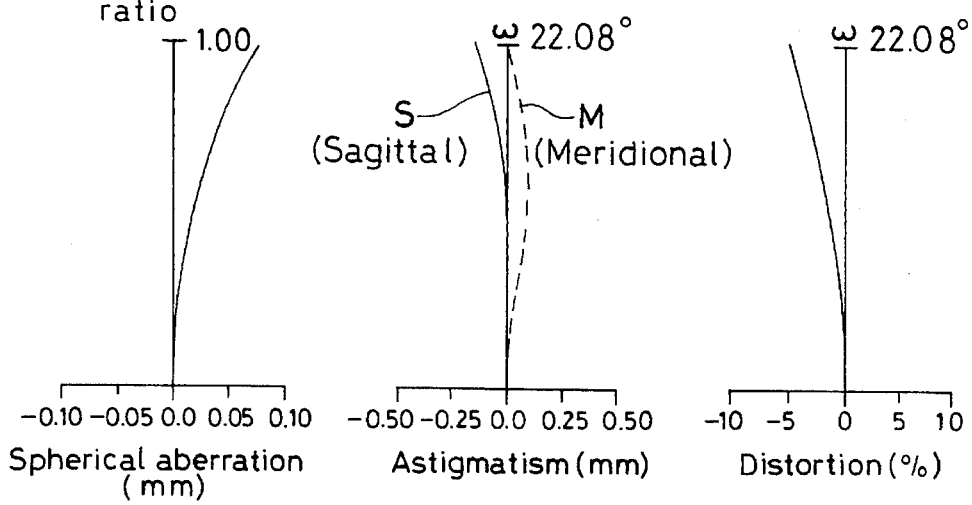
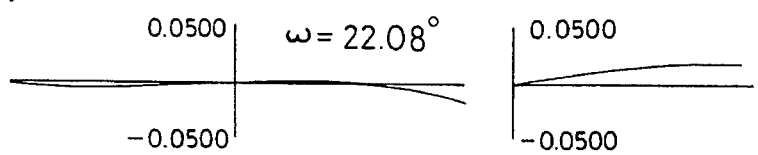
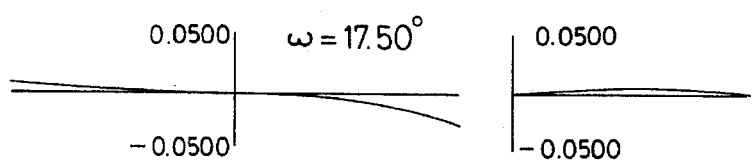
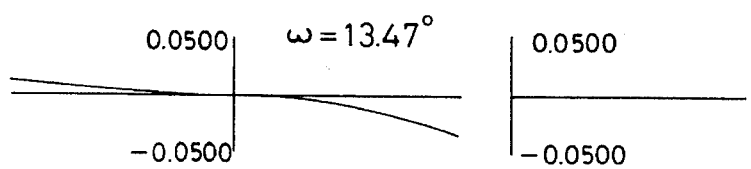
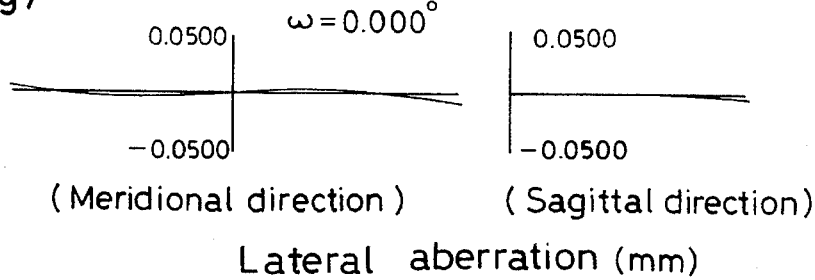

Pupil diameter ratio

−0.10 −0.05 0.0 0.05 0.10
Spherical aberration (mm)

ω 22.08°

−0.50 −0.25 0.0 0.25 0.50
Astigmatism (mm)

ω 22.08°

−10 −5 0 5 10
Distortion (%)

ω = 22.08°

ω = 17.05°

ω = 13.47°

ω = 0.000°

(Meridional direction)   (Sagittal direction)

Lateral aberration (mm)

Pupil diameter ratio 1.00
Spherical aberration (mm)

ω 22.08°
Astigmatism (mm)

ω 22.08°
Distortion (%)

ω = 22.08°

ω = 17.50°

ω = 13.47°

ω = 0.000°

(Meridional direction)    (Sagittal direction)

Lateral aberration (mm)

Lateral aberration (mm)

Pupil diameter ratio

Spherical aberration (mm)

Astigmatism (mm)

Distortion (%)

ω = 22.08°

ω = 17.50°

ω = 13.47°

ω = 0.000°

(Meridional direction)   (Sagittal direction)

Lateral aberration (mm)

(Meridional direction)   (Sagittal direction)

Lateral aberration (mm)

Pupil diameter ratio
1.00

-0.10 -0.05 0.0 0.05 0.10
Spherical aberration (mm)

ω 30.06°

-0.50 -0.25 0.0 0.25 0.50
Astigmatism (mm)

ω 30.06°

-10 -5 0 5 10
Distortion (%)

ω = 30.06°

ω = 25.00°

ω = 18.92°

ω = 0.000°

(Meridional direction)   (Sagittal direction)
Lateral aberration (mm)

1: Tow-dimensional display device
2: Concave mirror
3: Semitransparent mirror

1: Two-dimensional display device
4: Beam splitter prism
5: Reverse reflecting mirror FIG. 14(a)
Pupil diameter ratio
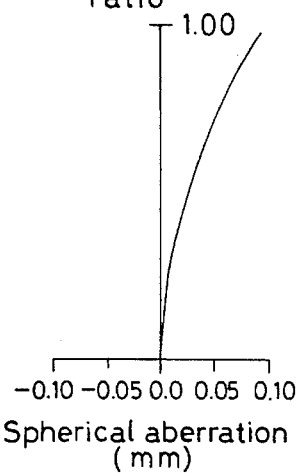
Spherical aberration (mm)
FIG. 14(b)
ω 18.75°
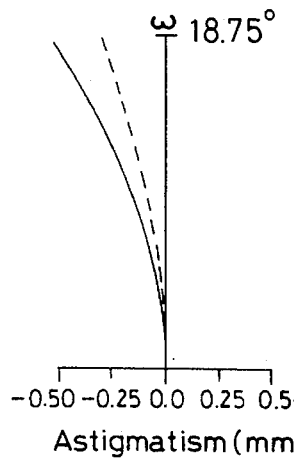
Astigmatism (mm)
FIG. 14(c)
ω 18.75°
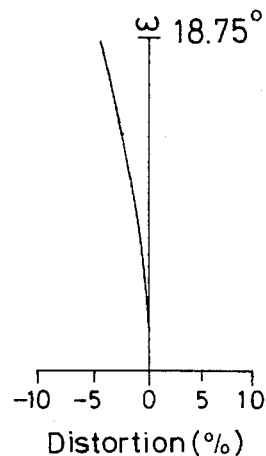
Distortion (%)
FIG. 14(d) ω = 18.75°
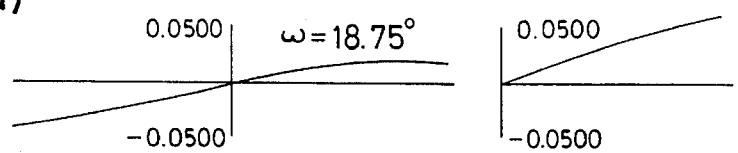
FIG. 14(e) ω = 15.00°
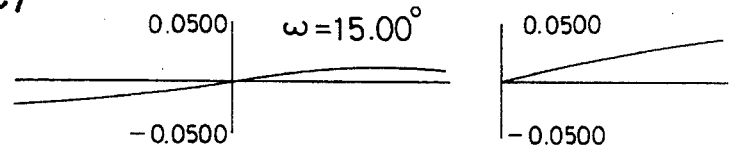
FIG. 14(f) ω = 11.25°
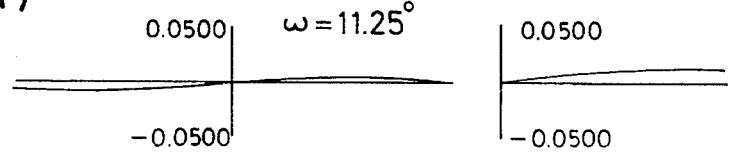
FIG. 14(g) ω = 0.000°
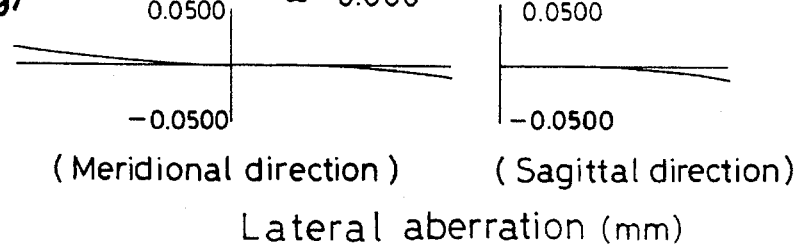
(Meridional direction)    (Sagittal direction)
Lateral aberration (mm)

HEAD-MOUNTED IMAGE DISPLAY APPARATUS HAVING A PRISM WITH AN ASPHERICAL SURFACE

BACKGROUND OF THE INVENTION

The present invention relates to an image display apparatus and, more particularly, to a portable head- or face-mounted image display apparatus which can be retained on the user's head or face.

In recent years, helmet- and goggle-type head-mounted image display apparatuses, which are designed to be retained on the user's head or face, have been developed for the purpose of enabling the user to enjoy virtual reality or a wide-screen image by oneself.

For example, Japanese Patent Application Laid-Open (KOKAI) No. 03-191389 (1991) discloses an image display apparatus which has, as shown in FIG. 12, a two-dimensional image display device 1 for displaying the content of information, a concave mirror 2 provided to face the display device 1 to project the display content on a user's eyeball as an enlarged image, and a semitransparent mirror 3 disposed between the display device 1 and the concave mirror 2, thereby enabling a wide-screen image to be obtained with a compact structure. If the semitransparent mirror 3 is adapted to pass also an outside world image, the user can observe the outside world image superimposed on the image displayed on the display device 1. To increase the working distance between the user's eyeball and the ocular optical system, the semitransparent mirror 3 may be replaced with a beam splitter prism 4 having a semitransparent surface, as shown in FIG. 13. In such a case, a reverse reflecting mirror 5 is used in place of the concave mirror 2. These ocular optical systems are designed on the assumption that the angle of view is about 30° in the horizontal direction, that is, in the direction of the x-z plane. The view angle of 30° is equivalent to a view angle where one watches a 26-inch television at a distance of 1 m. FIG. 14 graphically shows spherical aberration, astigmatism, distortion and lateral aberration at the horizontal view angle of 30° in the ocular optical system arranged as shown in FIG. 13.

In order to further enhance the feeling of being at the actual spot, which is given to the user when viewing the displayed image, the horizontal view angle of the image that is projected on the user's eyeball as an enlarged image must be made larger than 30°. The above-described conventional ocular optical system is compact, and yet it is capable of effectively correcting various aberrations, as shown in FIG. 14; this is a very important feature for a head-mounted image display apparatus. Accordingly, it is important to make the horizontal view angle greater than 30° while effectively using the advantageous feature. It is obvious in an actual ocular optical system having the above-described arrangement that the size of the prism increases as the angle of view is increased. The increase in the size of the prism causes the ocular optical system to increase in both size and weight; this is a fatal problem. The problem may be solved by providing a positive lens between the user's eyeball and the prism to bend the rays of light so that the prism can be made as compact as possible. However, in such an optical system, the most off-axis distortion becomes 10% or more, so that the distortion of the image at the edge of image field becomes large. Thus, the image provided by the optical system fails to allow the user to enjoy the feeling of being at the actual spot. The results of actual observation made by the present applicant have revealed that as long as the distortion is not larger than about 5%, the user can enjoy watching the displayed image without impairing the feeling of being at the actual spot. Thus, it is essential to reduce the distortion to about 5% by aberration correction even in a case where the angle of view is 30° or more.

SUMMARY OF THE INVENTION

In view of the above-described circumstances, it is an object of the present invention to provide an image display apparatus, for example, a head-mounted image display apparatus, which has a compact magnifying optical system designed so that the horizontal view angle is as wide as 30° or more, and yet the most off-axis distortion can be reduced to about 5%.

To attain the above-described object, the present invention provides an image display apparatus having a device for displaying an image, and an ocular optical system for forming an exit pupil to lead the image into an observer's eyeball, wherein the ocular optical system includes a prism having a half-mirror surface provided at a tilt with respect to an optical axis of light emitted from the image display device, the prism having an aspherical surface on the side thereof which faces the image display device.

In addition, the present invention provides an image display apparatus having a device for displaying an image, and an ocular optical system for forming an exit pupil to lead the image into an observer's eyeball, wherein the ocular optical system includes a prism having a first surface disposed to face the image display device, the first surface being an aspherical surface.

In these image display apparatuses, the aspherical surface is preferably shaped so that negative power becomes stronger as the distance from the optical axis of the prism increases toward the periphery thereof.

In addition, it is preferable for the configuration Z (y) of the aspherical surface to satisfy the following conditions (6) and (7):

$$Z=(y^2/r)/[1+\{1-(1+k)(y^2/r^2)\}^{1/2}]+Ay^4+By^6+Cy^8+Dy^{10} \quad (6)$$

$$0.5\times10^{-4}<|A|<0.4\times10^{-3} \quad (7)$$

where Z is the distance measured from the vertex of the aspherical surface in the direction of the optical axis; y is the distance measured from the vertex in a direction perpendicular to the optical axis; r is the radius of curvature of the vertex; k is the conical constant; and A, B, C and D are 4th-, 6-th, 8-th and 10-th order aspherical coefficients, respectively.

Alternatively, it is preferable for the configuration Z(y) of the aspherical surface to satisfy the following conditions (6) and (8):

$$Z=(y^2/r)/[1+\{1-(1+k)(y^2/r^2)\}^{1/2}]+Ay^4+By^6+Cy^8+Dy^{10} \quad (6)$$

$$0.05<|dZ/dy_c|<0.5 \quad (8)$$

where Z is the distance measured from the vertex of the aspherical surface in the direction of the optical axis; y is the distance measured from the vertex in a direction perpendicular to the optical axis; r is the radius of curvature of the vertex; k is the conical constant; A, B, C and D are 4th-, 6-th, 8-th and 10-th order aspherical coefficients, respectively; and the suffix "$_c$" indicates the chief ray.

Further, it is preferable to satisfy the following condition (1):

$$20 < f < 60 \text{ [mm]} \quad (1)$$

where f is the focal length of the ocular optical system, expressed in millimeter (mm).

It is also preferable to provide a positive lens between the exit pupil of the ocular optical system and the half-mirror surface or the prism.

Further, it is preferable to satisfy the following condition (2):

$$0.2 < |\phi_1/\phi| < 0.5 \quad (2)$$

where $\phi_1$ is the power of the positive lens, and $\phi$ is the power of the entire optical system.

In addition, the present invention provides an image display apparatus having a device for displaying an image, and an ocular optical system for forming an exit pupil to lead the image into an observer's eyeball, wherein the ocular optical system has a focal length f (mm) which satisfies the following condition (1):

$$20 < f < 60 \text{ [mm]} \quad (1)$$

The reason for adopting the above-described arrangements and the functions thereof will be explained below.

For the convenience of description, backward ray tracing is herein used with the eyeball side defined as the object point side and the display device side as the image point side.

In the display apparatus arranged as shown in FIG. 13, the beam splitter prism 4 is used as an optical axis bending device which is a constituent element necessary for increasing the optical path length to thereby lengthen the working distance between the user's eyeball and the optical system, which is insufficient in the case of a semitransparent mirror.

FIG. 10 is a view for explanation of the generation of distortion by a concave reflecting mirror. In FIG. 10, (i) shows an ideal, distortion-free system in which the optical system shown in FIG. 12 or 13 is treated as a thin-lens system, and (ii) shows a system in which actual ray tracing is carried out with a concave reflecting mirror. Assuming the focal length of each optical system is f and the half view angle is $\Theta$, since the eyeball is disposed at the focal point, the image height y in the optical system (i) is given by $$y = f \tan\Theta \quad (3)$$

The image height y' in the optical system (ii) is given by $$y' = f \sin\Theta \quad (4)$$

Accordingly, distortion may be expressed in percentage as follows:

$$[(f \sin\Theta - f \tan\Theta)/f \tan\Theta] \times 100 = [(\sin\Theta - \tan\Theta)/\tan\Theta] \times 100 = [\cos\Theta - 1] \times 100 \quad \ldots (5)$$

In the range of $0 < \Theta < 90°$, $(\cos\Theta - 1) < 0$, and hence the distortion in the optical system that uses a concave reflecting mirror assumes a minus value. In addition, as $\Theta$ becomes larger, the value of Equation (5) increases in the minus direction. In other words, as the angle of view is increased, the minus distortion becomes larger.

In actual practice, when the view angle $2\Theta$ is set at 30° in Equation (5), a distortion of −4% is generated. However, distortion of the order of −4% does not hinder the user from enjoying watching the displayed image. When $2\Theta$ exceeds 30°, however, a larger minus distortion is generated. To further increase the view angle while preventing the prism from increasing in size, it is preferable to provide a positive lens between the pupil and the prism. However, in this case also, a minus distortion further occurs at the pupil-side surface of the positive lens. The present invention has succeeded in reducing the distortion to about −5%.

In the present invention, an aspherical surface is used to correct the distortion. It is common practice to use an aspherical surface for aberration correction. The present invention is, however, characterized in that an aspherical surface is used as a surface of the prism on the side thereof which faces the display device. Although an aspherical surface may be employed for other surface, since the ocular optical system of the present invention is designed to project a virtual image without effecting image formation in the optical path, if an aspherical surface for correcting the distortion, that is, for controlling the chief ray, is employed, for example, for a surface where the diameter of the bundle of off-axis rays is relatively large, the upper and lower subsidiary rays vary considerably in the angle of incidence on the aspherical surface, causing comatic aberration to occur to a considerable extent. Further, since the curvatures of the meridional and sagittal surfaces differ from each other, large astigmatism is generated. Therefore, an aspherical surface is employed for a surface closer to the display device, that is, for a surface closer to the image surface in backward ray tracing, because at such a surface the height of the off-axis chief ray is high and the off-axis beam diameter is small, thereby enabling the chief ray to be controlled without aggravating coma and astigmatism. Thus, only the distortion can be effectively corrected. In the optical system of the present invention, only the surface of the prism that faces the display device is capable of attaining the object.

Further, the aspherical surface in the present invention is preferably shaped so that the power thereof changes from a relatively positive value to a relatively negative value as the distance from the optical axis of the prism increases toward the periphery thereof. This aspherical configuration is necessary for correcting the above-described minus distortion. The height of the off-axis chief ray that generates the minus distortion is lower than that of the light ray of zero distortion at the display device-side prism surface. To minimize the distortion, power which is negative relative to the axial power should be provided on a prism surface which is apart from the optical axis thereof so that the height of the off-axis chief ray, which is relatively low, is increased. It should be noted that if positive power is provided in the vicinity of the optical axis, it is possible to effectively cancel positive spherical aberration that is produced by other optical surface. For these reasons, it is preferable to shape the aspherical surface so that the power thereof changes from a relatively positive power to a relatively negative power as the distance from the optical axis of the prism increases toward the periphery thereof.

Further, it is preferable in the present invention to satisfy the following condition (1):

$$20 < f < 60 \text{ [mm]} \quad (1)$$

where f is the focal length of the ocular optical system, expressed in millimeter (mm).

This condition must be satisfied in order to attain an ocular optical system having a compact arrangement. If f is not larger than the lower limit of the condition (1), i.e., 20, although the angle of view increases, the focal length becomes excessively short, making it impossible to obtain a working distance between the optical system and the user's eyeball, which needs to be at least 10 mm. As a result, interference may occur between the optical system and the user's eyeball. If f is not smaller than the upper limit of the condition (1), i.e., 60, the focal length becomes long, resulting in an increase in the size of the optical system, although the working distance can be increased. Accordingly, a compact head-mounted image display apparatus cannot be attained unless the condition (1) is satisfied.

In addition to the above-described limitation on the focal length, it is preferable in the present invention to provide a positive lens between the user's eyeball and the eyeball-side prism surface; this is necessary for attaining a compact beam splitter prism. It is obvious that the prism becomes larger in size as the angle of view is increased, and this problem must be solved in order to lighten the weight of the ocular optical system. Therefore, a lens of positive power is interposed between the eyeball and the prism so that in the backward ray tracing a bundle of rays having a wide angle of view from the pupil of the eyeball is bent inwardly by the action of the positive lens, thereby minimizing the size of the prism.

Further, it is preferable in the present invention to satisfy the following condition (2):

$$0.2 < |\phi_1/\phi| < 0.5 \quad (2)$$

where $\phi_1$ is the power of the positive lens, and $\phi$ is the power of the entire optical system.

If $|\phi_1/\phi|$ is not larger than the lower limit of the condition (2), i.e., 0.2, the power of the positive lens becomes excessively weak, so that the prism undesirably increases in size. Conversely, if $|\phi_1/\phi|$ is not smaller than the upper limit of the condition (2), i.e., 0.5, the power of the positive lens becomes excessively strong, and the curvature of a surface that constitute the positive lens becomes strong, resulting in an increase of aberration produced by the lens surface. It is impossible to attain an ocular optical system which is compact and has minimal aberration unless the condition (2) is satisfied. With a view to moderating the curvature and increasing the design freedom, it is even more preferable to hold down the upper limit of the condition (2) to 0.4.

In addition, it is preferable for the aspherical surface in the present invention to satisfy either of the following conditions (7) and (8) when the configuration of the aspherical surface is given by the following expression (6):

$$Z=(y^2/r)/[1+\{1-(1+k)(y^2/r^2)\}^{1/2}]+Ay^4+By^6+Cy^8+Dy^{10} \quad (6)$$

$$0.5\times10^{-4} < |A| < 0.4\times10^{-3} \quad (7)$$

$$0.05 < |dZ/dy_c| < 0.5 \quad (8)$$

where Z is the distance measured from the vertex of the aspherical surface in the direction of the optical axis; y is the distance measured from the vertex in a direction perpendicular to the optical axis; r is the radius of curvature of the vertex; k is the conical constant; and A, B, C and D are 4th-, 6-th, 8-th and 10-th order aspherical coefficients, respectively.

The condition (7) defines the 4-th order aspherical coefficient of the aspherical surface. If $|A|$ is not smaller than the upper limit of the condition (7), i.e., $0.4\times10^{-3}$, the amount of aspherical surface becomes excessively large, causing off-axis aberrations to be aggravated. If $|A|$ is not larger than the lower limit of the condition (7), i e , $0.5\times10^{-4}$, the amount of aspherical surface becomes excessively small, making it impossible to correct aberrations satisfactorily.

On the other hand, $dZ/dy_c$ in the condition (8) limits the inclination of the aspherical surface at the height of the most off-axis chief ray (the suffix "$_c$" indicates the chief ray). If $|dZ/dy_c|$ is not larger than the lower limit of the condition (8), i.e., 0.05, the angle made between the chief ray and the aspherical surface becomes large, so that the chief ray is refracted to a considerable extent at the surface, causing the distortion to be increased. If $|dZ/dy_c|$ is not smaller than the upper limit of the condition (8), i.e., 0.5, the angle made between the chief ray and the aspherical surface is small, but the inclination of the aspherical surface at the height of the most off-axis chief ray becomes large instead. As a result, the variation of the aspherical surface from the vicinity of the optical axis becomes large, causing intermediate off-axis aberrations to be disordered. Thus, it is undesirable for $|dZ/dy_c|$ to be outside the above-described range, and the condition (8) must be satisfied.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a)–(g) graphically show spherical aberration, astigmatism, distortion and lateral aberration in Example 1.

FIGS. 14 (a)–(g) graphically show spherical aberration, astigmatism, distortion and lateral aberration in the display apparatus shown in FIG. 13.

DESCRIPTION OF THE PREFERRED EMBODIMENTS

Examples 1 to 7 of the optical system of the image display apparatus according to the present invention, in which it is arranged as a head-mounted image display apparatus, will be described below with reference to the accompanying drawings.

Figure 1:
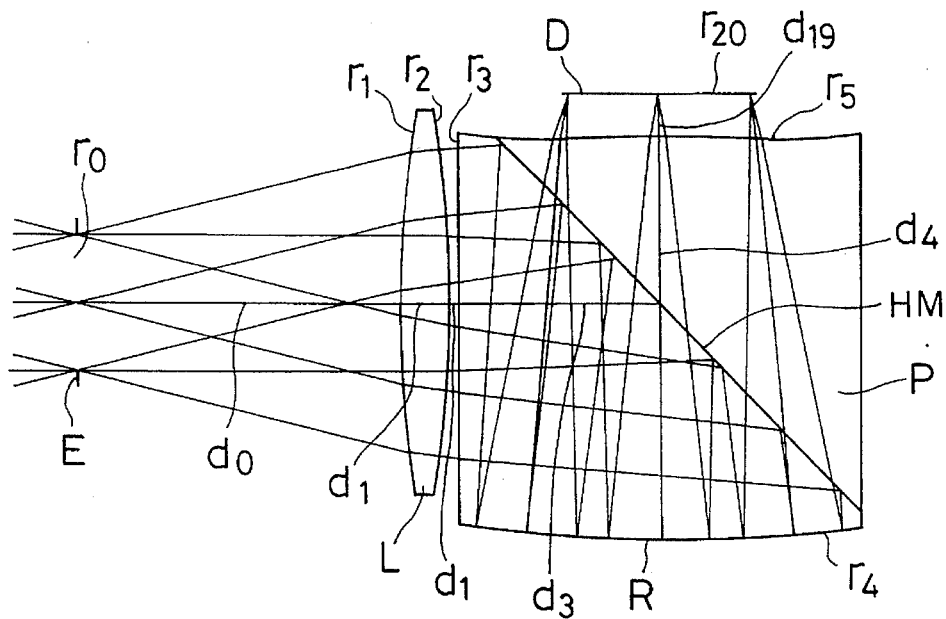
FIG. 1 is a sectional view showing Example 1 of the optical system of the image display apparatus according the present invention.
Figure 2:
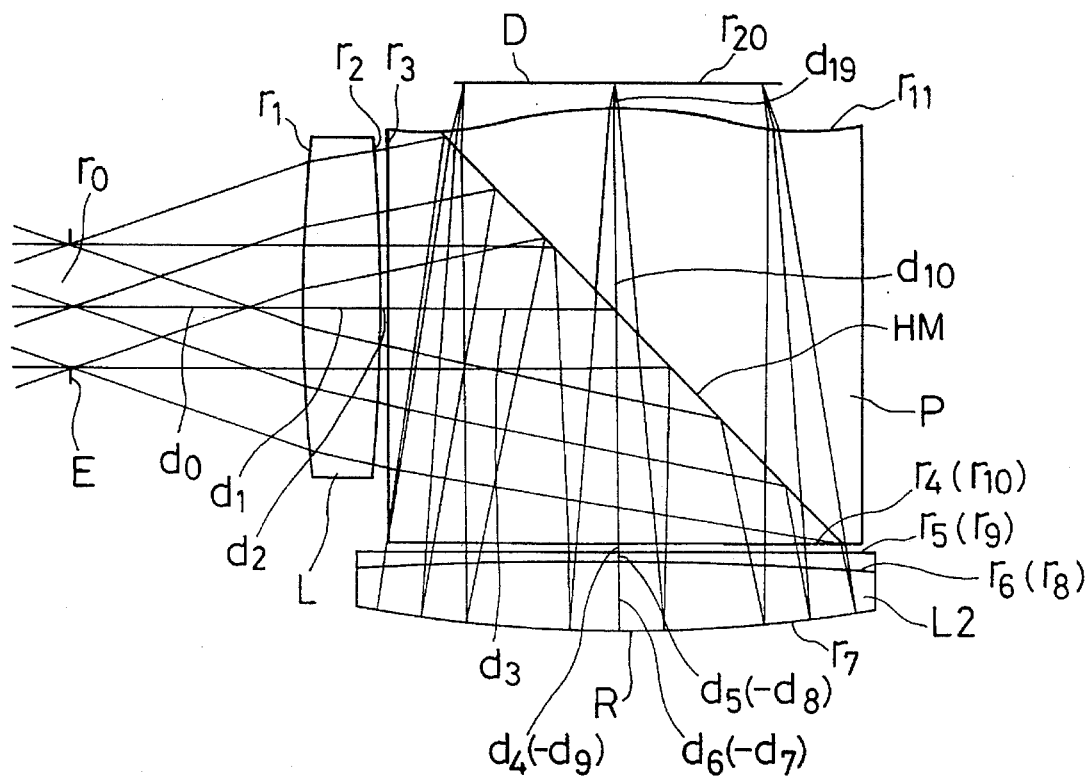
FIG. 2 is a sectional view showing Example 6 of the optical system of the image display apparatus according to the present invention.
Figure 4A:
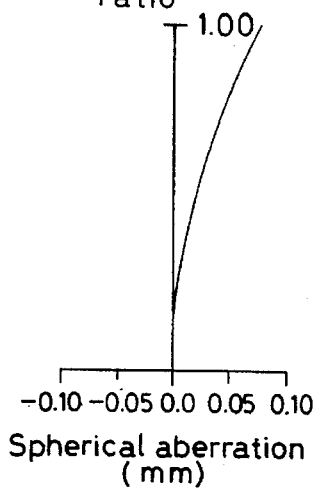
FIGS. 4(a)–(g) graphically show spherical aberration, astigmatism, distortion and lateral aberration in Example 2.
Figure 4B:
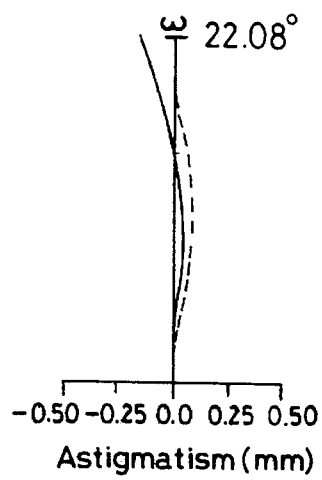
Figure 4C:
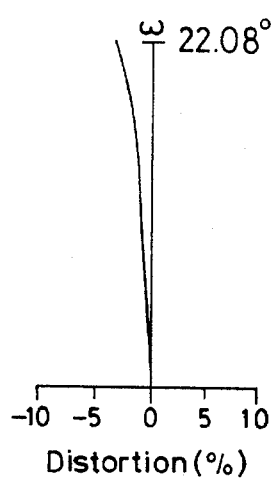
Figure 4D:
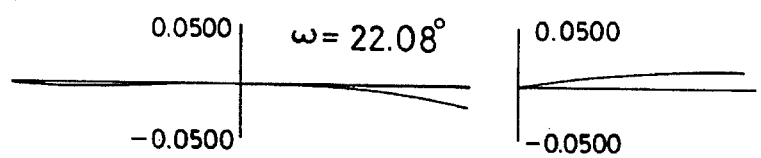
Figure 4E:
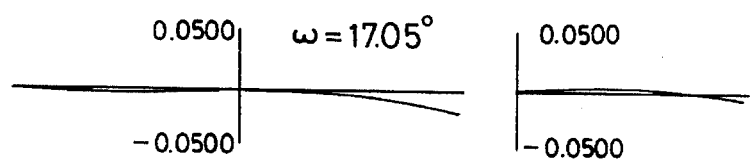
Figure 4F:
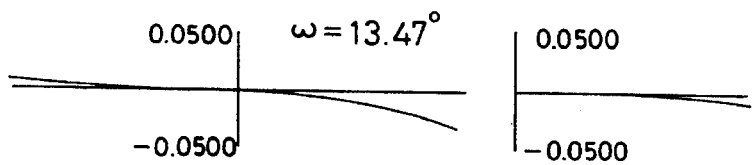
Figure 4G:
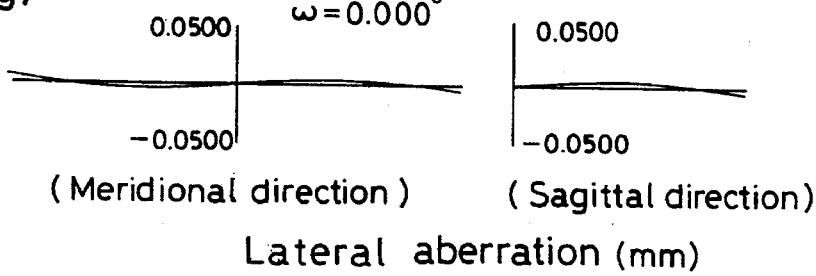
Figure 5A:
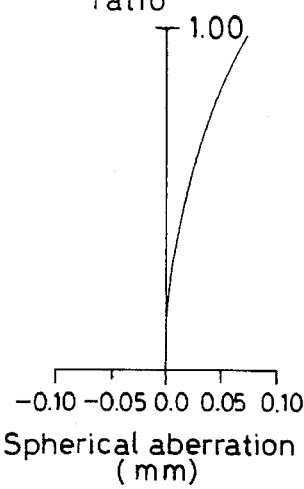
FIGS. 5(a)–(g) graphically show spherical aberration, astigmatism, distortion and lateral aberration in Example 3.
Figure 5B:
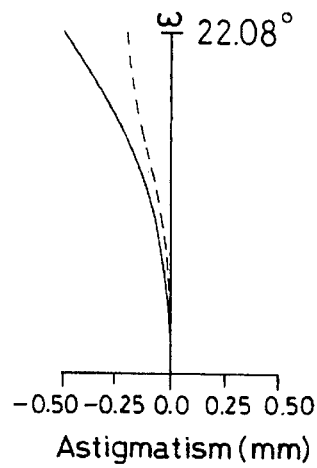
Figure 5C:
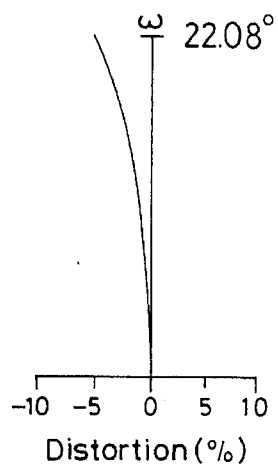
Figure 5D:
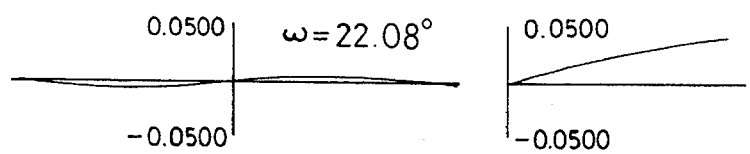
Figure 5E:
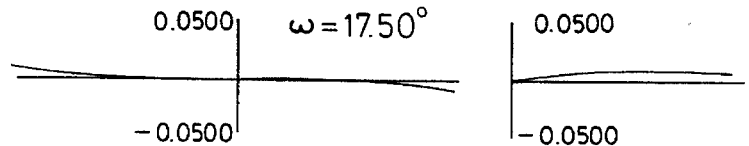
Figure 5F:
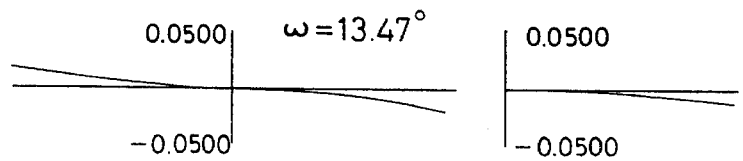
Figure 5G:
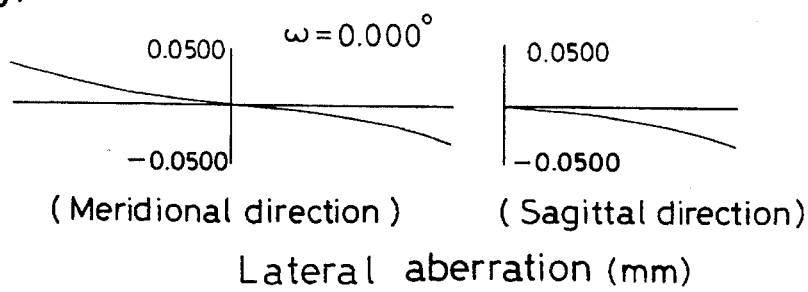
Figure 6A:
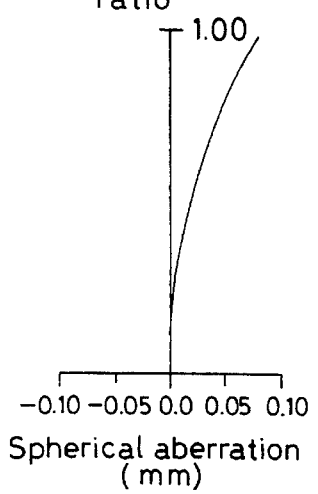
FIGS. 6(a)–(g) graphically show spherical aberration, astigmatism, distortion and lateral aberration in Example 4.
Figure 6B:
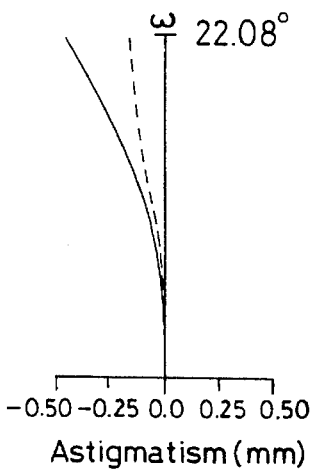
Figure 6C:
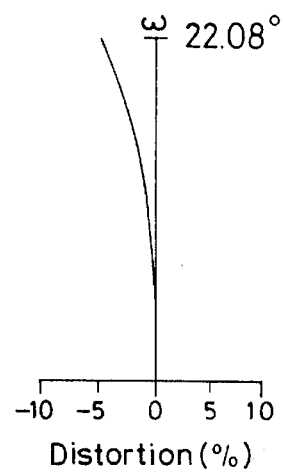
Figure 6D:
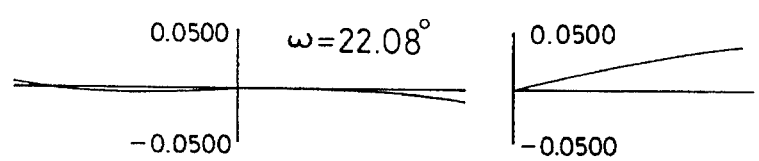
Figure 6E:
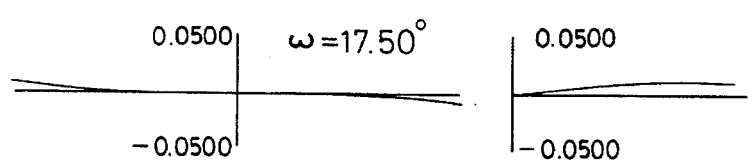
Figure 6F:
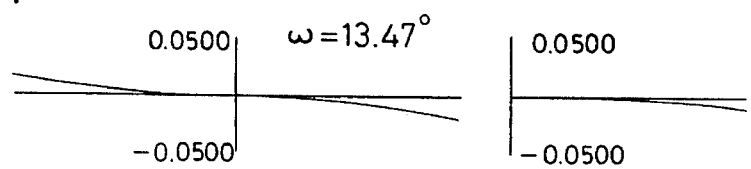
Figure 6G:
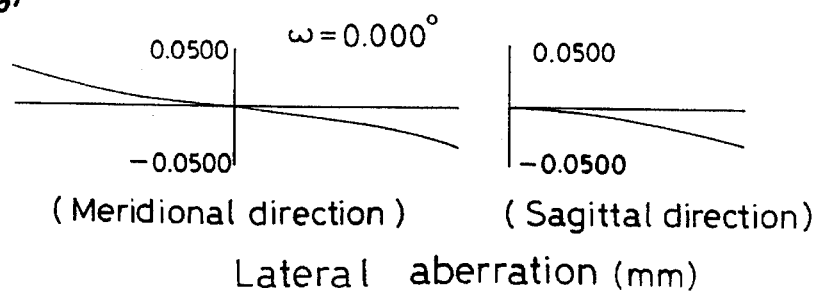
Figure 7A:
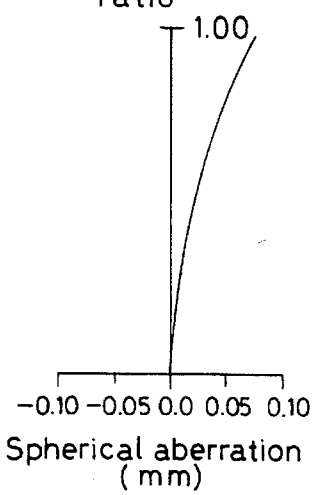
FIGS. 7(a)–(g) graphically show spherical aberration, astigmatism, distortion and lateral aberration n Example 5.
Figure 7B:
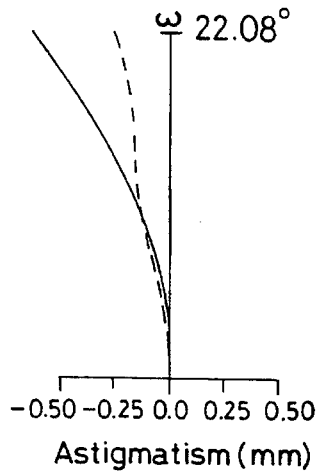
Figure 7C:
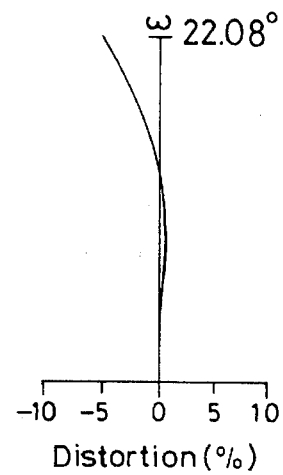
Figure 7D:
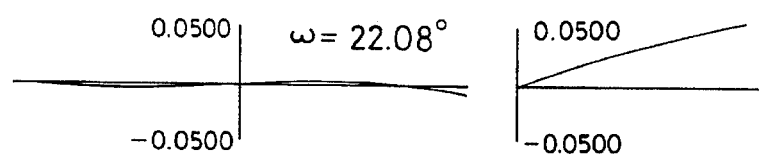
Figure 7E:
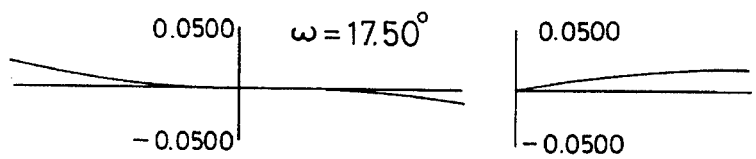
Figure 7F:
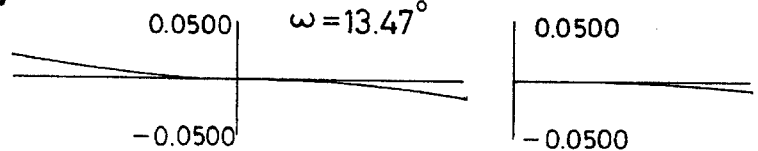
Figure 7G:
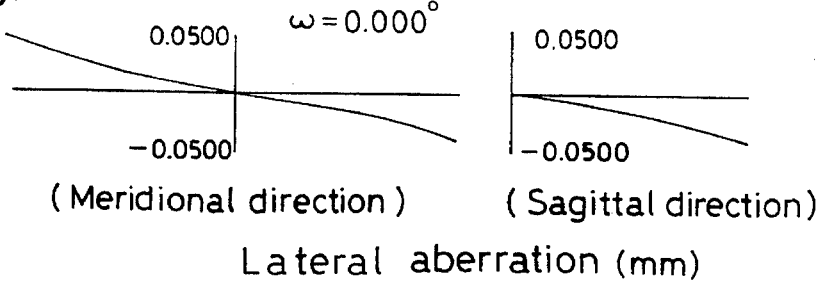
Figure 8A:
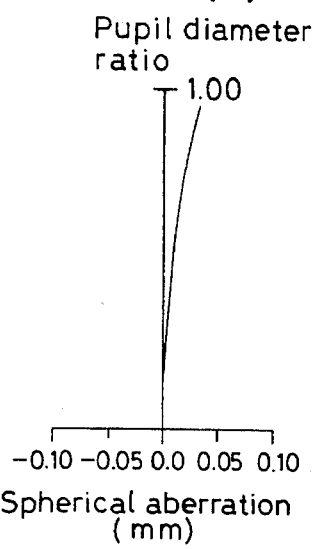
FIGS. 8(a)–(g) graphically show spherical aberration, astigmatism, distortion and lateral aberration n Example 6.
Figure 8B:
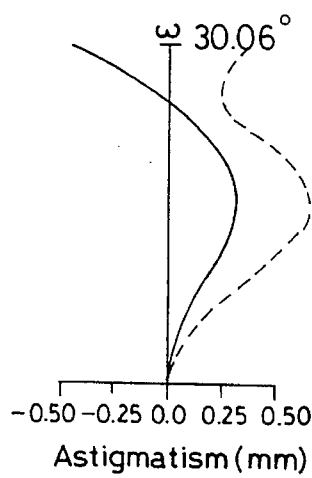
Figure 8C:
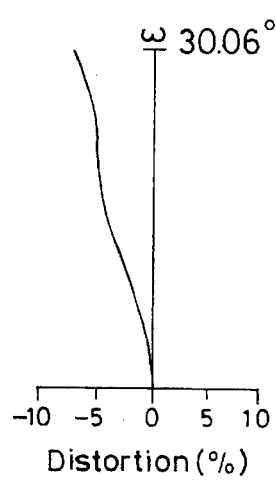
Figure 8D:
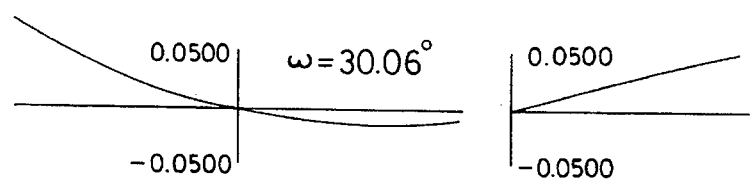
Figure 8E:
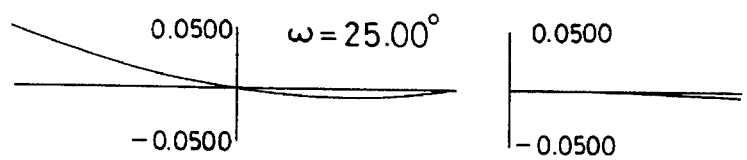
Figure 8F:
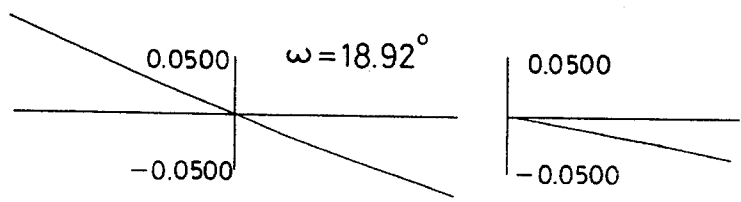
Figure 8G:
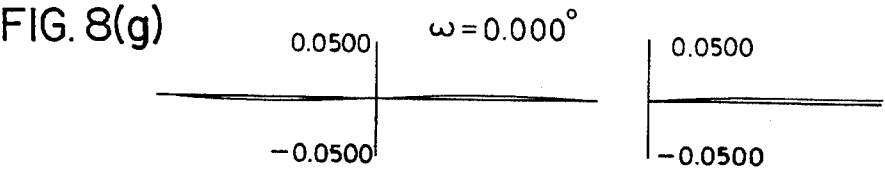
Figure 9A:
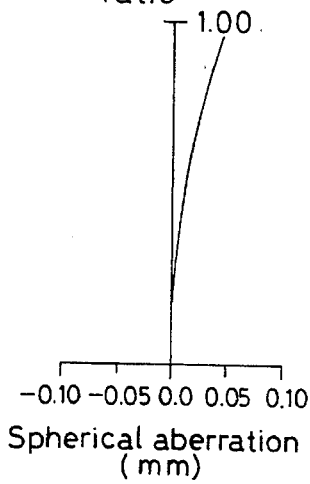
FIGS. 9(a)–(g) graphically show spherical aberration, astigmatism, distortion and lateral aberration in Example 7.
Figure 9B:
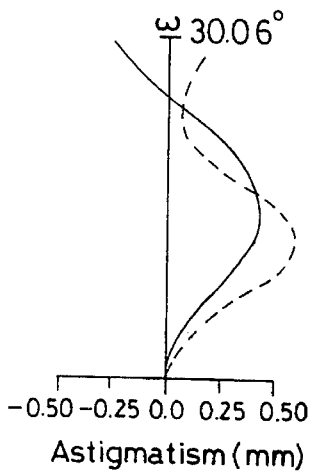
Figure 9C:
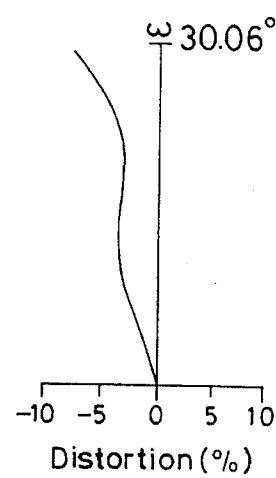
Figure 9D:
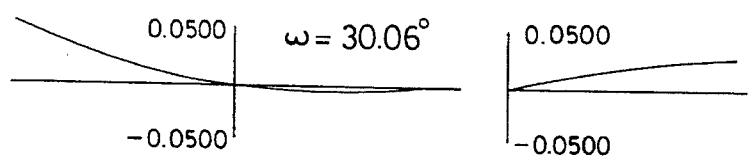
Figure 9E:
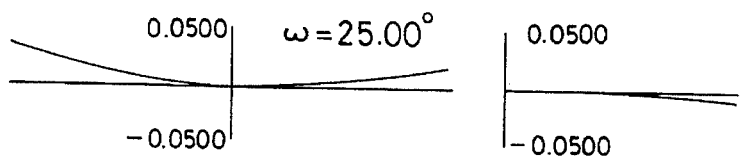
Figure 9F:
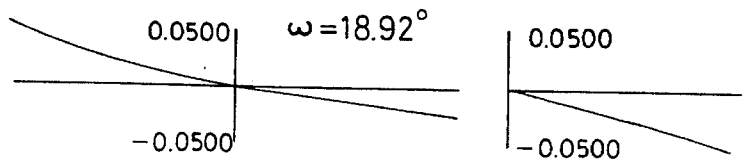
Figure 9G:
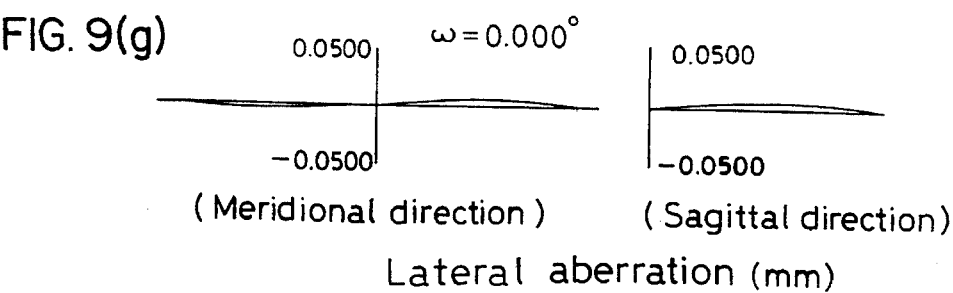
Figure 10A:
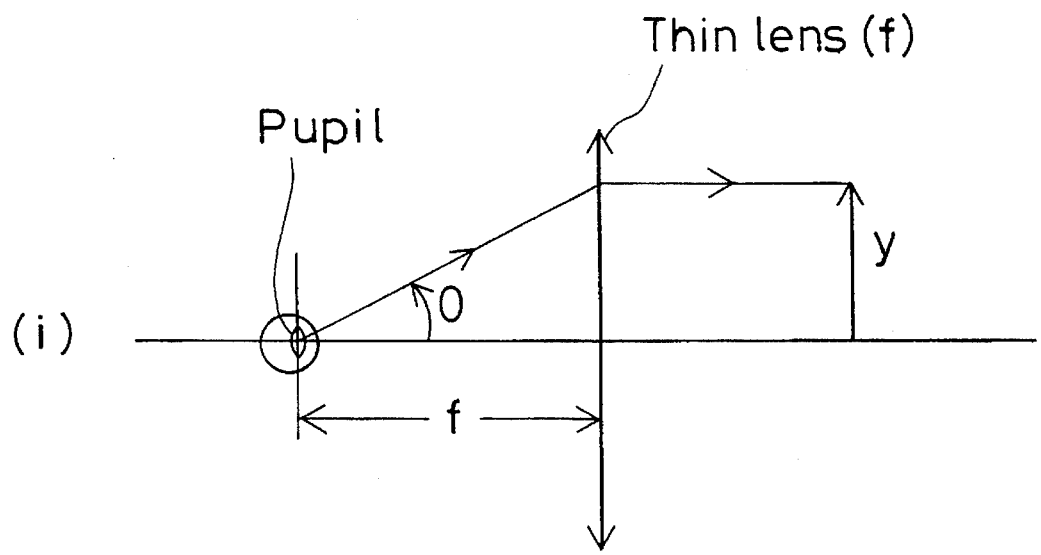
FIG. 10 is a view for explanation of the generation of distortion by a concave reflecting mirror.
Figure 10B:
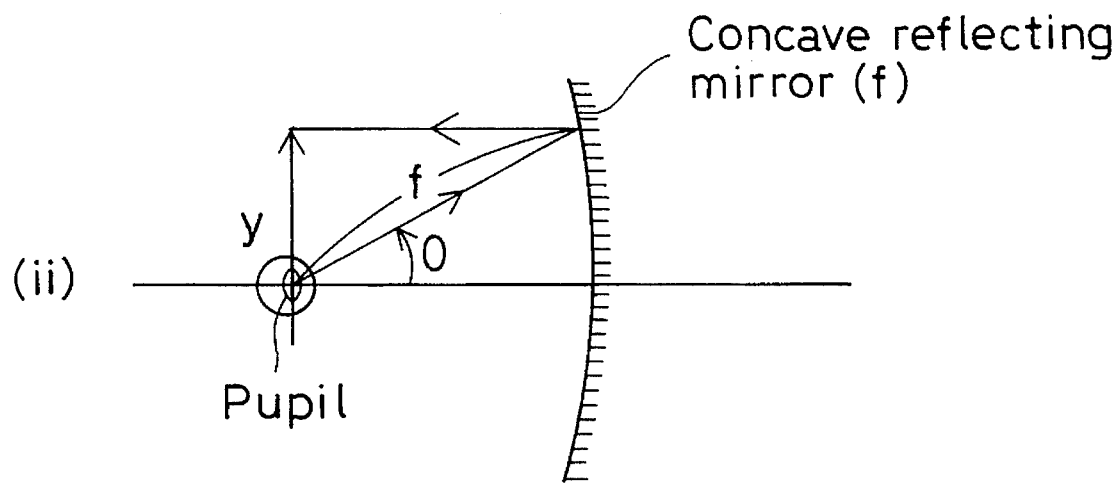

FIGS. 1 and 2 are sectional views of Examples 1 and 6, respectively, taken along a plane perpendicular to the direction of observation. The arrangement of Examples 2 to 5 is substantially the same as that of Example 1, while the arrangement of Example 7 is substantially the same as that of Example 6. Therefore, illustration of Examples 2 to 5 and 7 is omitted.

Reference symbols in FIG. 1 will be explained below in the order of backward ray tracing from the observer's eyeball to the display device: Reference symbol E denotes the pupil position of an observer's eyeball; L denotes a biconvex lens; P denotes a beam splitter prism; R denotes a concave reflecting surface (reverse reflecting mirror); and D denotes the display surface of a display device. In FIG. 2: reference symbol E denotes the pupil position of an observer eyeball; L denotes a biconvex lens; P denotes a beam splitter prism; L2 denotes a cemented lens; R denotes a concave reflecting surface (reverse reflecting mirror); and D denotes the display surface of a display device. In both FIG. 1 and FIG. 2, prism P has a half-mirror surface HM which both transmits light from display surface D to concave reflecting surface R and reflects light therefrom to pupil position E. The side of prism P which faces the display surface D (surface $r_5$ in FIG. 1 and surface $r_{11}$ in FIG. 2) is aspherical.

In Examples 1 to 5, the angle of view is 35° ($2\omega=35°$) in the horizontal observation direction; in Examples 6 and 7, the angle of view is 50° ($2\omega=50°$) in the horizontal observation direction. The pupil diameter is 8 mm in all Examples.

Lens data obtained by backward ray tracing in Examples 1 to 7 will be shown below. Reference symbols are as follows: $r_0$ is the pupil E; $d_0$ is the eyepoint; $r_1, r_2 \ldots$ are the radii of curvature of lens surfaces or reflecting surfaces; $d_1, d_2 \ldots$ are the spacings between adjacent surfaces; $n_{d1}, n_{d2} \ldots$ are the refractive indices for the spectral d-line of the glass materials; $\nu_{d1}, \nu_{d2}$ are the Abbe's numbers of the glass materials; $d_{19}$ is the distance between the display device-side surface of the beam splitter prism P and the display device D; and $r_{20}$ is the display device D. Further, the aspherical configuration is given by the above expression (6).

Example 1

$r_0 = \infty$  $d_0 = 20.000000$
$r_1 = 77.43753$  $d_1 = 3.000000$  $n_{d1} = 1.51633$  $\nu_{d1} = 64.1$
$r_2 = -77.43753$  $d_2 = 5.000000$
$r_3 = \infty$  $d_3 = 26.000000$  $n_{d2} = 1.51633$  $\nu_{d2} = 64.1$
$r_4 = -81.57246$  $d_4 = -24.000000$  $n_{d3} = 1.51633$  $\nu_{d3} = 64.1$
(Reflective)
$r_5 = 63.91929$  $d_{19} = -2.383824$
(Aspheric)
$r_{20} = \infty$
Aspherical Coefficients 5th surface
$k = -1.000000$
$A = -0.608643 \times 10^{-4}$
$B = C = D = 0$
Example 2

$r_0 = \infty$  $d_0 = 20.000000$
$r_1 = 79.36857$  $d_1 = 3.000000$  $n_{d1} = 1.51633$  $\nu_{d1} = 64.1$
$r_2 = -79.36857$  $d_2 = 0.500000$
$r_3 = \infty$  $d_3 = 26.000000$  $n_{d2} = 1.51633$  $\nu_{d2} = 64.1$
$r_4 = -81.23816$  $d_4 = -24.000000$  $n_{d3} = 1.51633$  $\nu_{d3} = 64.1$
(Reflective)
$r_5 = 33.78031$  $d_{19} = -2.470484$
(Aspheric)

$r_{20} = \infty$
Aspherical Coefficients

5th surface
$k = -1.000000$
$A = -0.147534 \times 10^{-3}$
$B = 0.366295 \times 10^{-6}$
$C = D = 0$
Example 3

$r_0 = \infty$  $d_0 = 20.000000$
$r_1 = 74.25602$  $d_1 = 3.000000$  $n_{d1} = 1.51633$  $\nu_{d1} = 64.1$
$r_2 = -74.25602$  $d_2 = 0.500000$
$r_3 = \infty$  $d_3 = 26.000000$  $n_{d2} = 1.51633$  $\nu_{d2} = 64.1$
$r_4 = -80.08536$  $d_4 = -24.000000$  $n_{d3} = 1.51633$  $\nu_{d3} = 64.1$
(Reflective)
$r_5 = 4142.92319$  $d_{19} = -1.880994$
(Aspheric)
$r_{20} = \infty$
Aspherical Coefficients 5th surface
$k = -1.000000$
$A = -0.106968 \times 10^{-3}$
$B = C = D = 0$
Example 4

$r_0 = \infty$  $d_0 = 20.000000$
$r_1 = 73.93257$  $d_1 = 3.000000$  $n_{d1} = 1.51633$  $\nu_{d1} = 64.1$
$r_2 = -73.93257$  $d_2 = 0.500000$
$r_3 = \infty$  $d_3 = 26.000000$  $n_{d2} = 1.51633$  $\nu_{d2} = 64.1$
$r_4 = -80.43616$  $d_4 = -24.000000$  $n_{d3} = 1.51633$  $\nu_{d3} = 64.1$
(Reflective)
$r_5 = 179.78039$  $d_{19} = -1.888758$
(Aspheric)
$r_{20} = \infty$
Aspherical Coefficients 5th surface
$k = -1.000000$
$A = -0.165504 \times 10^{-3}$
$B = 0.458241 \times 10^{-6}$
$C = D = 0$
Example 5

$r_0 = \infty$  $d_0 = 20.000000$
$r_1 = 72.48992$  $d_1 = 3.000000$  $n_{d1} = 1.51633$  $\nu_{d1} = 64.1$
$r_2 = -72.48992$  $d_2 = 0.500000$
$r_3 = \infty$  $d_3 = 26.000000$  $n_{d2} = 1.51633$  $\nu_{d2} = 64.1$
$r_4 = -81.01813$  $d_4 = -24.000000$  $n_{d3} = 1.51633$  $\nu_{d3} = 64.1$
(Reflective)
$r_5 = 168.60494$  $d_{19} = -1.816503$
(Aspheric)
$r_{20} = \infty$
Aspherical Coefficients 5th surface
$k = -1.000000$
$A = -0.349756 \times 10^{-3}$
$B = 0.163775 \times 10^{-5}$
$C = D = 0$
Example 6

$r_0 = \infty$  $d_0 = 15.000000$
$r_1 = 88.18321$  $d_1 = 5.000000$  $n_{d1} = 1.51633$  $\nu_{d1} = 64.1$
$r_2 = -179.42903$  $d_2 = 0.500000$
$r_3 = \infty$  $d_3 = 30.000000$  $n_{d2} = 1.51633$  $\nu_{d2} = 64.1$
$r_4 = \infty$  $d_4 = 0.500000$
$r_5 = 4251.13671$  $d_5 = 0.500000$  $n_{d3} = 1.80517$  $\nu_{d3} = 25.4$
$r_6 = 221.74679$  $d_6 = 4.545995$  $n_{d4} = 1.51633$  $\nu_{d4} = 64.1$
$r_7 = -92.09157$  $d_7 = -4.545995$  $n_{d5} = 1.51633$  $\nu_{d5} = 64.1$
(Reflective)
$r_8 = 221.74679$  $d_8 = -0.500000$
$r_9 = 4251.13671$  $d_9 = -0.500000$  $n_{d6} = 1.80517$  $\nu_{d6} = 25.4$
$r_{10} = \infty$  $d_{10} = -28.000000$  $n_{d7} = 1.51633$  $\nu_{d7} = 64.1$
$r_{11} = 23.00264$  $d_{19} = -1.443245$
(Aspheric)
$r_{20} = \infty$
Aspherical Coefficients -continued 11th surface
k = −1.000000
A = −0.677856 × 10⁻⁴
B = C = D = 0

Example 7

| | | | |
|---|---|---|---|
| $r_0 = \infty$ | $d_0 = 15.000000$ | | |
| $r_1 = 134.07129$ | $d_1 = 5.000000$ | $n_{d1} = 1.51633$ | $v_{d1} = 64.1$ |
| $r_2 = -100.69485$ | $d_2 = 0.500000$ | | |
| $r_3 = \infty$ | $d_3 = 30.000000$ | $n_{d2} = 1.51633$ | $v_{d2} = 64.1$ |
| $r_4 = \infty$ | $d_4 = 0.500000$ | | |
| $r_5 = 446.86010$ | $d_5 = 0.500000$ | $n_{d3} = 1.80517$ | $v_{d3} = 25.4$ |
| $r_6 = 140.56826$ | $d_6 = 5.101641$ | $n_{d4} = 1.51633$ | $v_{d4} = 64.1$ |
| $r_7 = -100.02406$ | $d_7 = -5.101641$ | $n_{d5} = 1.51633$ | $v_{d5} = 64.1$ |
| (Reflective) | | | |
| $r_8 = 140.56826$ | $d_8 = -0.500000$ | $n_{d6} = 1.80517$ | $v_{d6} = 25.4$ |
| $r_9 = 446.86010$ | $d_9 = -0.500000$ | | |
| $r_{10} = \infty$ | $d_{10} = -28.000000$ | $n_{d7} = 1.51633$ | $v_{d7} = 64.1$ |
| $r_{11} = 16.04635$ | $d_{19} = -1.463416$ | | |
| (Aspheric) | | | |
| $r_{20} = \infty$ | | | |

Aspherical Coefficients

11th surface
k = −1.000000
A = −0.150592 × 10⁻³
B = 0.205450 × 10⁻⁶
C = D = 0

FIGS. 3 to 9 graphically show spherical aberration, astigmatism, distortion and lateral aberration in Examples 1 to 7.

It should be noted that values corresponding to the above-described conditions (1), (2), (7) and (8) in Examples 1 to 7 are as follows:

TABLE 1

| | f | $\phi_1/\phi$ | \|A\| | \|dZ/dy_c\| |
|---|---|---|---|---|
| Example 1 | 23.78 | 0.32 | 0.608 × 10⁻⁴ | 0.070 |
| 2 | 23.32 | 0.30 | 0.147 × 10⁻³ | 0.065 |
| 3 | 23.84 | 0.33 | 0.107 × 10⁻³ | 0.339 |
| 4 | 23.78 | 0.33 | 0.166 × 10⁻³ | 0.290 |
| 5 | 23.84 | 0.34 | 0.350 × 10⁻³ | 0.387 |
| 6 | 29.73 | 0.26 | 0.678 × 10⁻⁴ | 0.406 |
| 7 | 29.89 | 0.27 | 0.151 × 10⁻³ | 0.174 |

Figure 11A:
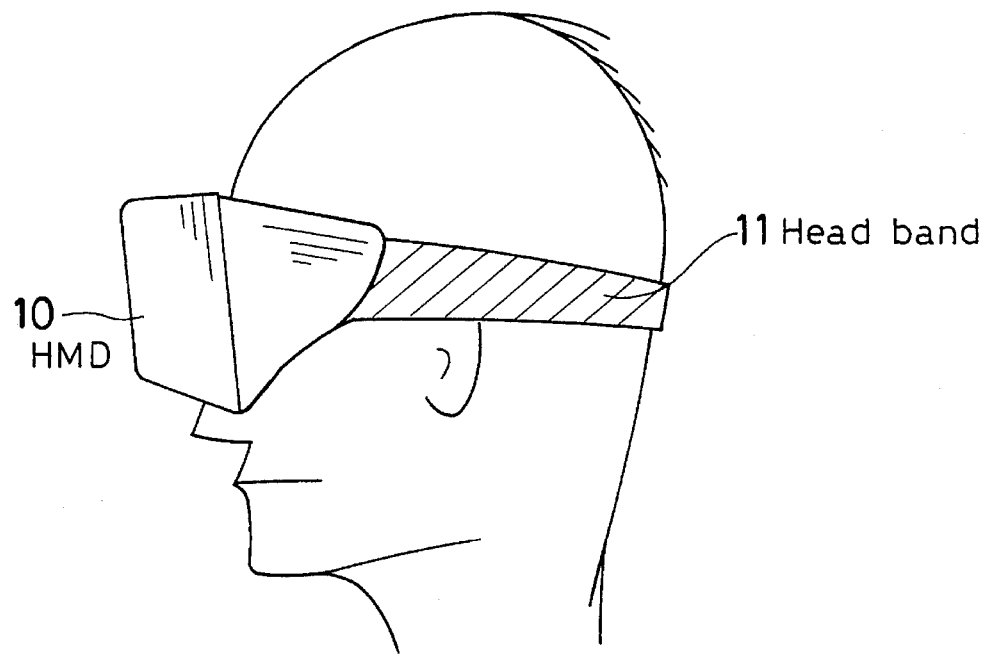
FIG. 11(a) is a perspective view of a head-mounted image display apparatus according to the present invention.
Figure 11B:
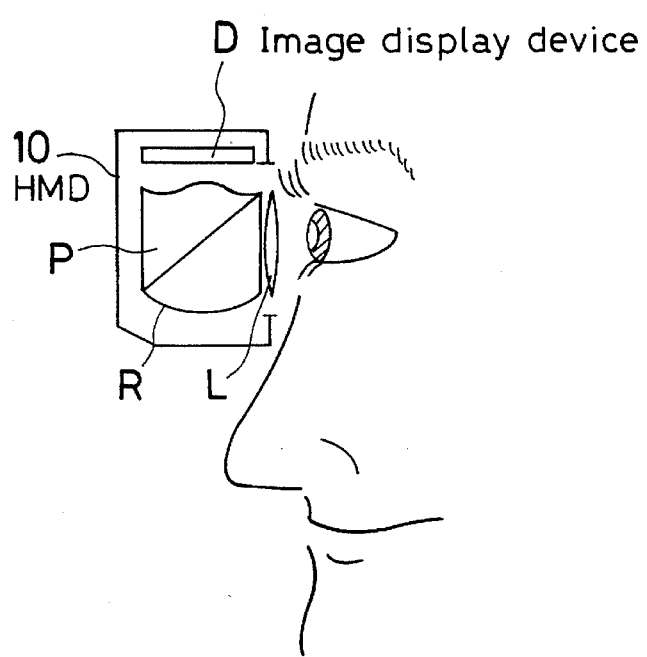
FIG. 11(b) is a sectional view of the head-mounted image display apparatus shown in FIG. 11(a).
Figure 12:
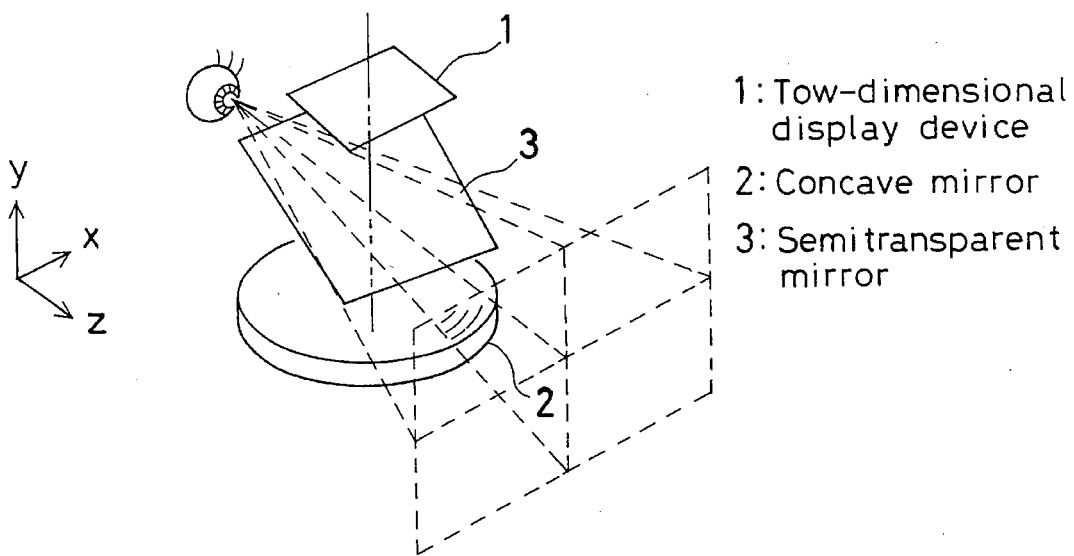
FIG. 12 shows the arrangement of a conventional head-mounted image display apparatus.
Figure 13:
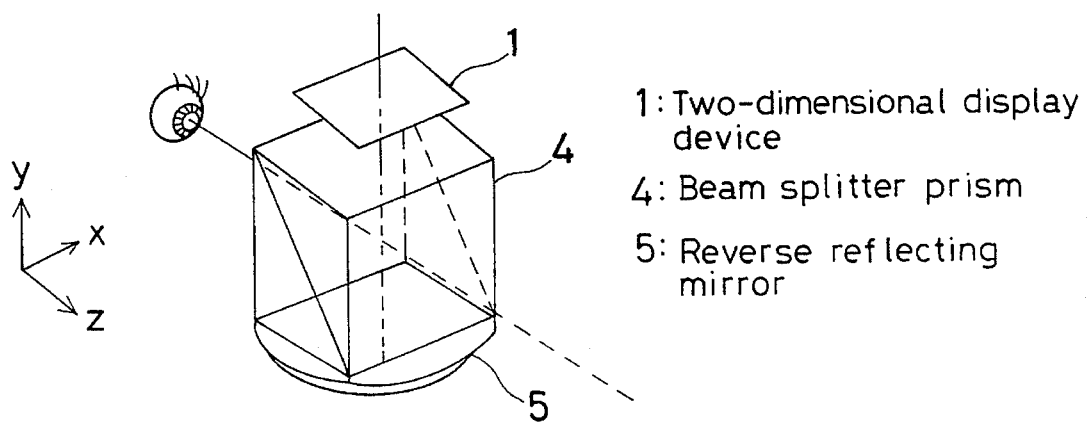
FIG. 13 shows the arrangement of another conventional head-mounted image display apparatus.

Although the image display apparatus of the present invention has been described above by way of some examples, it should be noted that the present invention is not necessarily limited to these examples, and that various changes and modifications may be imparted thereto. The image display apparatus of the present invention, when used as a head-mounted image display apparatus (HMD) 10, is mounted on the observer's head with a head band 11, for example, attached to the apparatus, as shown in a perspective view in FIG. 11(*a*) and also in a sectional view in FIG. 11(*b*). The head-mounted image display apparatus shown in FIG. 11(*b*) may be arranged such that a shutter is provided in front of the beam splitter prism P in the direction of the observer's line of sight, thereby enabling an outside world image to be selectively observed or superimposed on the image displayed by the display device D by opening the shutter.

As has been described above, the arrangement of the present invention enables the distortion to be reduced to about 5% or less at a horizontal view angle of 30° or more. Thus, it is possible to provide an image display apparatus, for example, a head-mounted image display apparatus, having a compact optical system which provides a wide angle of view and yet produces no distortion.

What we claim is:

1. A head-mounted image display apparatus comprising:
an image display device for displaying an image, and
an ocular optical system for forming an exit pupil to lead said image into an observer's eyeball,
wherein said ocular optical system includes a prism having a predetermined surface having both reflecting and transmitting functions and being provided at a tilt with respect to an optical axis of light emitted from said image display device,
said prism having an aspherical surface on the side thereof which faces said image display device.

2. A head-mounted image display apparatus comprising:
an image display device for displaying an image, and
an ocular optical system for forming an exit pupil to lead said image into an observer's eyeball,
wherein said ocular optical system includes a prism having a first surface disposed to face said image display device,
said first surface being an aspherical surface.

3. An apparatus according to claim 1 or 2, wherein said aspherical surface is shaped so that negative power becomes stronger as the distance from an optical axis of said prism increases toward the periphery thereof.

4. An image display apparatus according to claim 1 or 2, wherein the configuration Z(y) of said aspherical surface satisfies the following conditions (6) and (7):

$$Z=(y^2/r)/[1+\{1-(1+k)(y^2/r^2)\}^{1/2}]+Ay^4+By^6+Cy^8+Dy^{10} \quad (6)$$

$$0.5\times^{-4}<|A|<0.4\times10^{-3} \quad (7)$$

where Z is a distance measured from the vertex of said aspherical surface in the direction of an optical axis of said prism; y is a distance measured from the vertex in a direction perpendicular to the optical axis; r is a radius of curvature of the vertex; k is a conical constant; and A, B, C and D are 4th-, 6-th, 8-th and 10-th order aspherical coefficients, respectively.

5. An apparatus according to claim 1 or 2, wherein the configuration Z(y) of said aspherical surface satisfies the following conditions (6) and (8):

$$Z=(y^2/r)/[1+\{1-(1+k)(y^2/r^2)\}^{1/2}]+Ay^4+By^6+Cy^8+Dy^{10} \quad (6)$$

$$0.05<|dz/dy_c|<0.5 \quad (8)$$

where Z is a distance measured from the vertex of said aspherical surface in the direction of an optical axis of said prism; y is a distance measured from the vertex in a direction perpendicular to the optical axis; r is a radius of curvature of the vertex; k is a conical constant; A, B, C and D are 4th-, 6-th, 8-th and 10-th order aspherical coefficients, respectively; and the suffix"$_c$" indicates a chief ray.

6. An image display apparatus according to claim 1 or 2, wherein said ocular optical system has a focal length f (mm) which satisfies the following condition (1):

$$20<f<60 \text{ [mm]} \quad (1).$$

7. An image display apparatus according to claim 1, wherein a positive lens is provided between the exit pupil of said ocular optical system and said predetermined surface.

8. An apparatus according to claim 2, wherein a positive lens is provided between the exit pupil of said ocular optical system and said prism.

9. An apparatus according to claim 7 or 8, which satisfies the following condition (2):

$$0.2 < |\phi_1/\phi| < 0.5 \qquad (2)$$

where $\phi_1$ is the power of said positive lens, and $\phi$ is the power of the entire optical system.

10. A head-mounted image display apparatus according to claim 1, wherein said ocular optical system further includes a concave reflecting surface which is disposed to face said predetermined surface and has a refractive index which is larger than 1.

11. A head-mounted image display apparatus according to claim 2, wherein said ocular optical system comprises a predetermined surface capable of reflecting and transmitting a bundle of light rays emitted from said image display device, and a concave reflecting surface having a refractive index which is larger than 1.

12. A head-mounted image display apparatus according to claim 10 or 11, wherein said predetermined surface is provided in a direction of propagation of the bundle of light rays emitted from said image display device, and said concave reflecting surface faces said predetermined surface so that a turn-back optical path for a round-trip travel of the bundle of light rays from said image display device is formed between said predetermined surface and said concave reflecting surface.

13. A head-mounted image display apparatus according to claim 10 or 11, wherein the image that is formed by said image display device is corrected for aberrations by aspherical surface and said concave reflecting surface so that said image can be observed at a horizontal field angle which is not smaller than 30°.

14. A head-mounted image display apparatus according to claim 1 or 2, wherein said image display device and said ocular optical system are mounted on a face-mounted unit, said head-mounted image display apparatus further having a support member for retaining said face-mounted unit on an observer's head.

\* \* \* \* \*